Oct. 8, 1935.                F. CLARKE                2,016,958
                              SPLINT
                         Filed Nov. 1, 1934
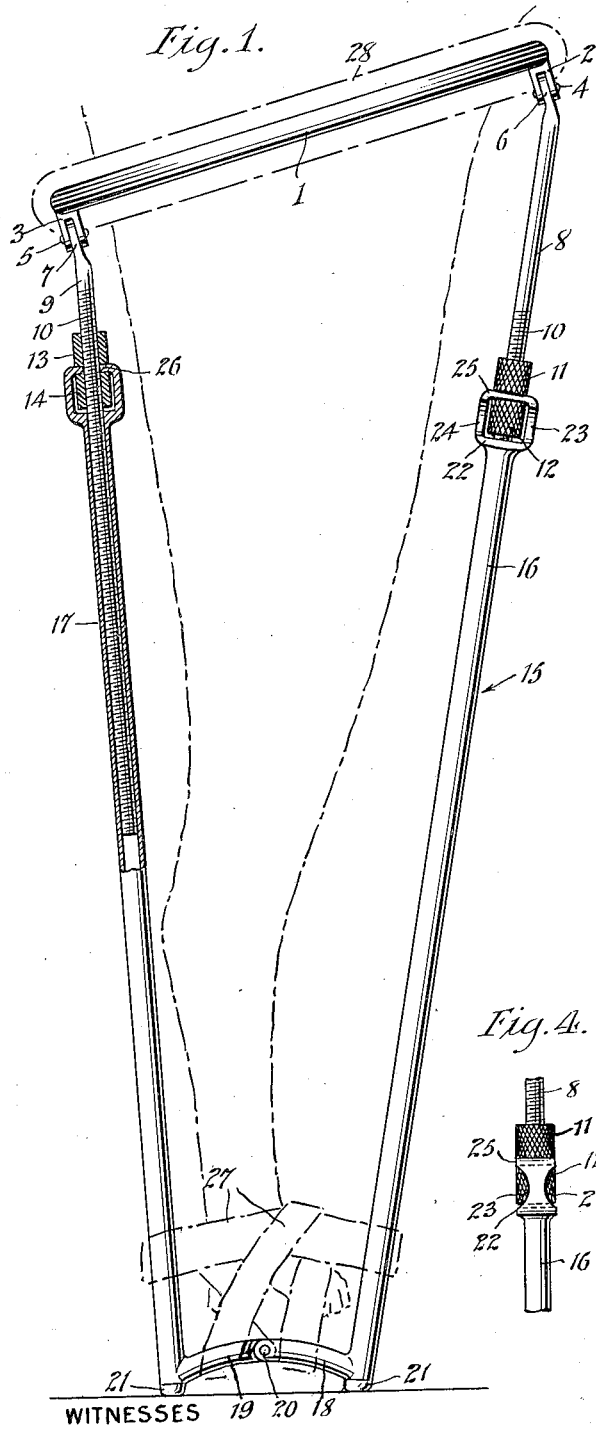
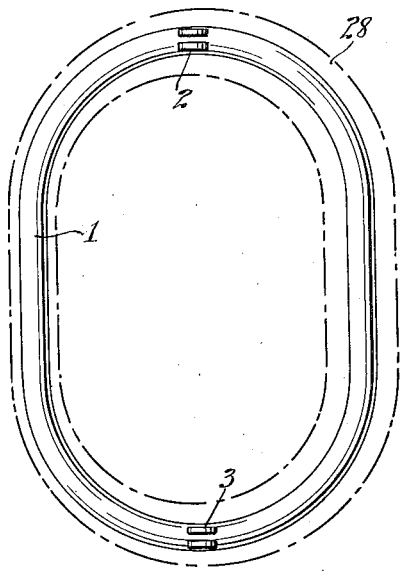
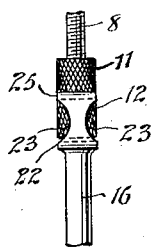
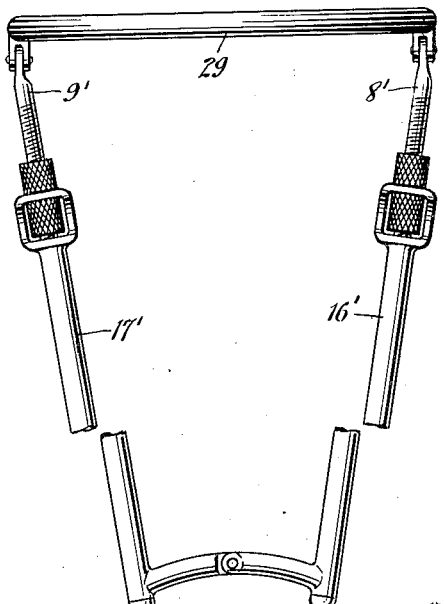
INVENTOR
Frederick Clarke Patented Oct. 8, 1935

2,016,958

UNITED STATES PATENT OFFICE 2,016,958

SPLINT

Frederick Clarke, Long Island City, N. Y.

Application November 1, 1934, Serial No. 751,077

3 Claims. (Cl. 128—87)

This invention relates to splints used in surgery and particularly to an improved splint for animals, an object being to provide a construction wherein the animal may move about and use the splint in a certain sense as an artificial leg or crutch.

Another object of the invention is to provide an improved splint which is particularly adapted for dogs and arranged to be used on either the front or hind leg, the construction being such that the legs may be stretched from time to time to the exact amount desired.

An additional object is to provide a splint for the leg of a dog wherein threaded members are provided and mounted in such a way as by an actuation thereof the upper part of the leg is held stationary and the lower part is pulled so as to move the bones toward or into an aligned position.

A further object more specifically is to provide a splint which is adapted to be mounted upon the leg of a dog and after adjusted to be used in a certain sense as a crutch, the lower part having wearing knobs capable of taking care of the wearer as the dog moves about.

In the accompanying drawing:

Figure 1 is a side view of a splint disclosing an embodiment of the invention, certain parts being broken away, and a dot-and-dash outline of a dog's hind leg shown positioned in the splint;

Fig. 2 is a bottom plan view of a substantially elliptical support as shown in Fig. 1;

Fig. 3 is a view similar to Fig. 1 but upon a reduced scale, the same being formed to accommodate the front leg of a dog; and Fig. 4 is a detail fragmentary side view of one of the adjusting connections shown in Fig. 1.

In dog surgery it has been found to be rather difficult to properly set a broken bone in one of the legs. When a dog's leg becomes broken the bone quite often overlaps or moves out of correct alignment in some manner, and in order to secure a proper setting the bone must be pulled back to its correct position. It has been found undesirable to pull the bone back at one operation into correct position and, consequently, various means have been provided heretofore to produce a gradual pulling or an intermittent pulling of the leg so as to gradually or intermittently pull the bone into proper alignment. The devices heretofore provided have numerous disadvantages, as, for instance, quite often the leg is pulled more than necessary and then allowed to move back. This is very painful and also is more or less objectionable as it retards the healing action.

In the present invention a splint has been provided which will only pull the leg to the extent desired and will never permit the leg to move back. It has been found in actual practice that a movement of about one-quarter of an inch is desirable at the point of each adjustment, and heretofore in adjusting splints quite often the movement was greater than a quarter of an inch and then in order to overcome this greater movement the parts were allowed to move back a short distance. In the splint shown, for instance, in Fig. 1 of the accompanying drawing, the leg may be stretched at any time to cause the bone to move one-quarter of an inch, one-eighth of an inch, or any other desired distance and remain in the new position.

As illustrated in the accompanying drawing, the splint is provided with what may be termed a ring 1, which for the hind leg, as shown in Figs. 1 and 2, is more or less elliptical rather than a true ring as the ends are somewhat circular and the two sides are straight. This ring or brace is provided with pairs of ears 2 and 3, said ears having apertures for receiving the respective pins 4 and 5, which pins extend through apertured extensions 6 and 7 of adjusting rods 8 and 9. The adjusting rods 8 and 9 are preferably solid rods though they could be tubular. Each rod is provided with threads 10 so as to accommodate the respective nuts 11, 12, 13 and 14. These nuts coact with each other, with the rods 8 and 9, and with what may be termed a frame 15. The frame 15 is provided with tubular bars 16 and 17, which have lateral extensions 18 and 19, hinged or otherwise connected together at 20. Also each of bars at the lower end is provided with a wearing block 21, which may be made from hard metal or other suitable material and which is permanently secured in place. At the upper end each of the bars 16 and 17 is provided with an enlargement 22 having restricted posts 23 and 24 merging into a second enlargement 25, said second enlargement having an aperture 26 permitting the respective rods 8 and 9 to extend into the hollow bars 16 and 17. It will be observed that the nuts 12 and 14 are within a housing formed by the members 22 to 25, inclusive, while the nuts 11 and 13 are arranged above this housing. It will also be observed that the respective nuts are rather elongated and are knurled. This arrangement prevents the nuts from engaging different objects against which the dog may rub. The housing for enclosing the respective nuts 12 and 14 is very desirable as it permits a person to manually actuate these nuts at any time, but prevents, to a large extent, the dog rubbing these nuts against objects and thereby rotating the nuts and loosening the various parts.

When the splint is to be used a padding 28 of any desired kind is fitted on to the ring 1, and then the parts moved to substantially the position shown in Fig. 1. Suitable adhesive strips 27 are then passed around the leg near the foot and the foot is bound thereby to the bars 16 and 17 and also to the extensions 18 and 19, so that when the splint is elongated there will be a desired pull on the leg. After the parts have been positioned as shown, the nuts 11 and 13 are unscrewed or moved upwardly as shown in Fig. 1, and then the nuts 12 and 14 are actuated to move the ring 1 and the lateral extensions 18 and 19 away from each other. While this is being done the surgeon is watching the bone through a fluoroscope and when the desired stretch has been secured the nuts 11 and 13 are screwed down tight against the respective members 25, so as to lock the parts against accidental shifting. After the splint has been mounted in the manner just described, the dog is permitted freedom and in walking or running may use the splint as a crutch. In this way the dog may have proper exercise and yet the injured leg may be taken care of in the desired manner.

In the course of a day or two when it is desired to move the bone to a new position, the surgeon will again look at the bone through a fluoroscope and, at the same time, adjust the respective nuts to cause the desired movement of the bone, which is seldom more than one-quarter of an inch. This is done from time to time until the bone is moved to a position in alignment. The nuts are so set that the parts are held in the adjusted position and allowed to remain in that position until the fracture has healed. After the fracture has been completely healed, the nuts are actuated to loosen the parts and the adhesive tapes or other strips 26 are removed. The split may then be pulled off the leg easily and the dog allowed to use the leg in the usual manner.

When the fracture occurs on a front leg, the structure shown in Fig. 3 is used, the same being identical with that shown in Fig. 1, except that the side bars 16' and 17' are of the same length and also the rods 8' and 9' are of the same length, and the ring 29 is preferably round so as to fit against the body of the dog at the front leg. Aside from the parts just mentioned, the splint shown in Fig. 1 is identical with that shown in Fig. 3 so that no additional description is thought necessary.

I claim:

1. A splint for dogs or the like, comprising a ring adapted to encircle the leg of a dog, a frame having hollow bars, means at the lower end of said bars presenting laterally extending projections, means for hingedly connecting said projections together so as to permit independent movement of the respective bars in a plane containing both of them as the splint is adjusted, means acting as an arm at the upper end of each of said bars for connecting the bars with said ring, and threaded means including traveling nuts associated with each of said bars for moving said ring toward and from said projections.

2. A splint for the legs of dogs, comprising a ring adapted to encircle the leg where it joins the body, a pair of rods pivotally connected with said ring at diametrically opposite sides, each of said rods being threaded, a frame having a pair of tubular rods, said threaded rods extending into said tubular rods, means for connecting said tubular rods together at the lower end, each of said tubular rods having a housing at the upper end provided with open sides and an open top, said rods extending through said open top, a nut arranged in each of said housings, surrounding the respective rods, and a lock nut surrounding each of said rods adapted to be screwed down against said housings for locking the rods against accidental movement.

3. A splint for dogs, comprising a ring adapted to encircle the dog's leg near the place where it joins the body, a frame pivotally connected to said ring, means at the lower end of said frame for connecting the parts together, said means including a hinge whereby each part of the frame may be independently adjusted in a plane containing both of them, and means for independently adjusting each part of the frame so that either end of said ring may be moved independently of the other.

FREDERICK CLARKE.